United States Patent
Rachkov

[11] Patent Number: 6,056,845
[45] Date of Patent: May 2, 2000

[54] BONDING OF ELECTRIC COILS

[75] Inventor: Rossen A. Rachkov, Bothell, Wash.

[73] Assignee: Globe Products Inc., Huber Heights, Ohio

[21] Appl. No.: 09/154,849

[22] Filed: Sep. 17, 1998

Related U.S. Application Data

[60] Provisional application No. 60/059,188, Sep. 17, 1997.

[51] Int. Cl.$^7$ .................................................. B32B 31/24
[52] U.S. Cl. ................................ 156/274.2; 156/308.2; 156/379.7; 156/538; 29/596; 29/732
[58] Field of Search ........................... 156/273.9, 274.2, 156/308.2, 309.6, 379.7, 538; 29/596, 598, 605, 606, 732; 336/205

[56] References Cited

U.S. PATENT DOCUMENTS

| | | |
|---|---|---|
| 3,806,051 | 4/1974 | Camardella . |
| 4,612,702 | 9/1986 | Wheeler ..................................... 29/596 |
| 5,740,600 | 4/1998 | Rasberry .............................. 156/274.2 |

*Primary Examiner*—Michael W. Ball
*Assistant Examiner*—Michael A Tolin
*Attorney, Agent, or Firm*—Roger S. Dybvig

[57] ABSTRACT

High speed bonding of wound electric components, and particularly armatures, having coils wound from bondable wire is obtained by providing a component support table having equally-spaced component-receiving stations and repeatedly indexing the table in a predetermined direction through predetermined increments. Plural wound and unbonded electric components are loaded in plural, mutually-adjacent stations on the table. After loading a first predetermined number of wound electric components, and while continuing to index the support table, an electric current is applied to the coils thereof to cause the coils of the first set of components to be heated and bonded while a second set of components is being loaded into successive stations. The application of electric current is accomplished by the use of a bonding head plate that is movable toward and away from the support table and rotates with the support table while electric current is supplied to the coils being bonded. An armature orienting mechanism is provided if needed to ensure proper electrical connection of the bonding heads to commutator bars.

7 Claims, 5 Drawing Sheets

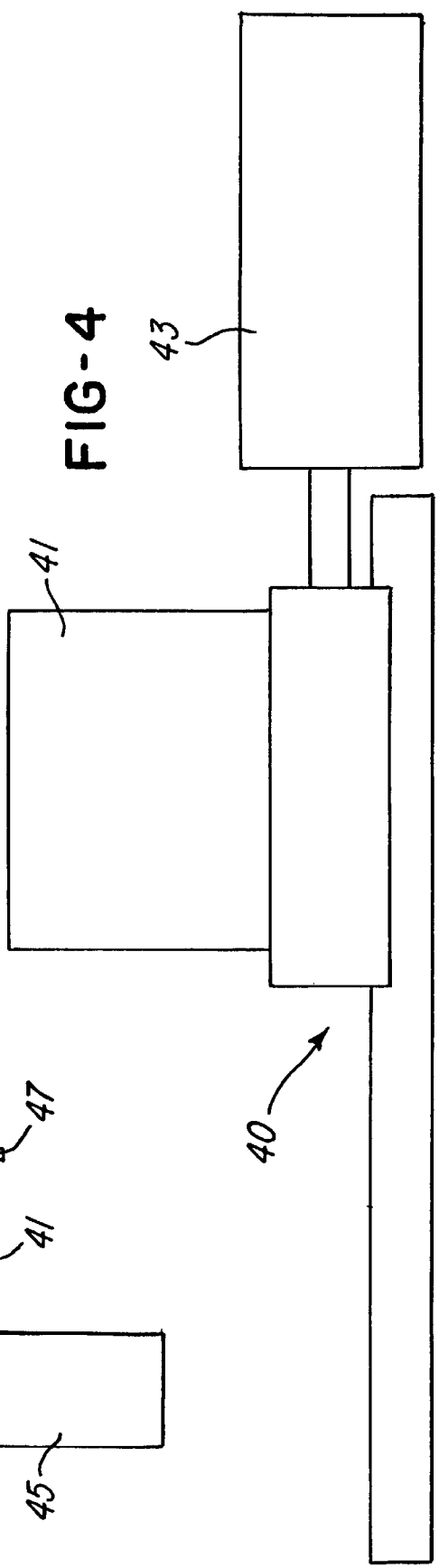
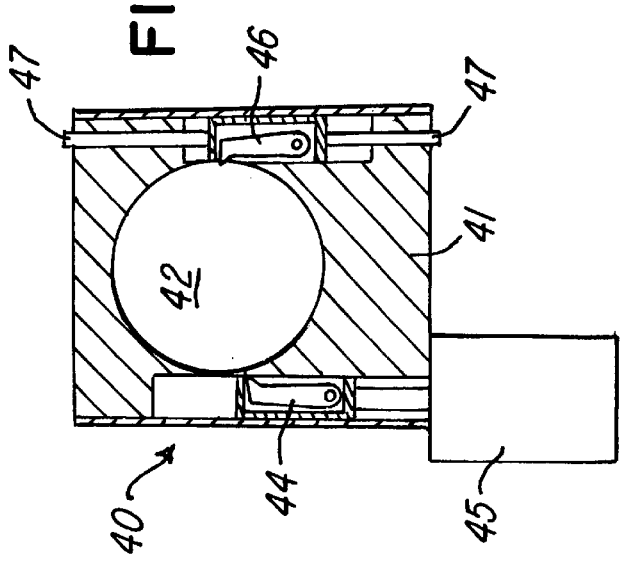

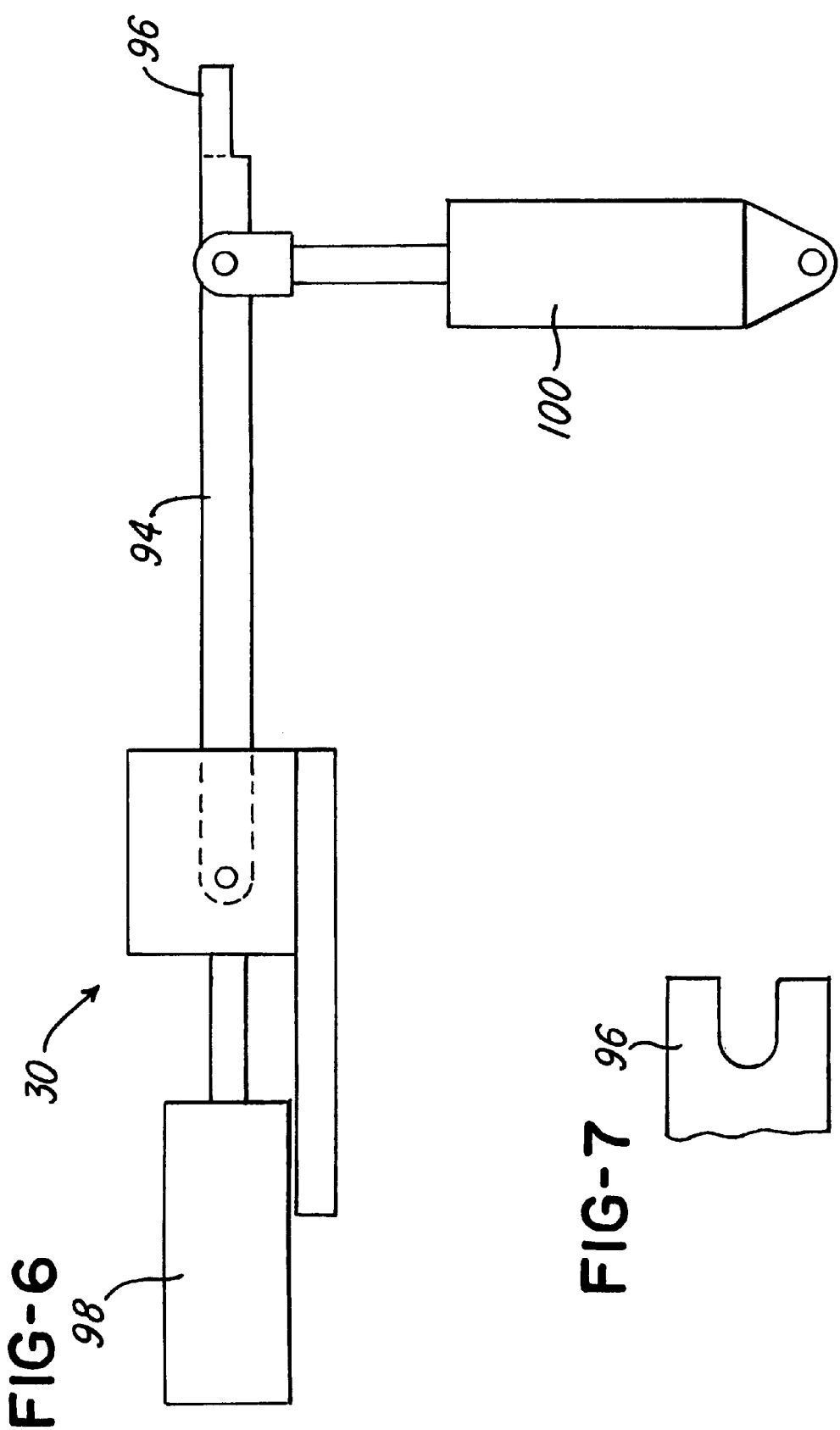

BONDING OF ELECTRIC COILS

CROSS REFERENCE TO RELATED APPLICATION

This application claims the benefit of copending U.S. Provisional Application No. 60/059,188, filed Sep. 17, 1997.

FIELD OF THE INVENTION

This invention relates to the bonding of electrical coils wound from a type of magnet wire, termed "bondable wire," coated with a bonding compound which becomes tacky when heated by the passage of an electrical current through the coil winding. When sufficiently heated, the bonding compound applied to adjacent turns of the coil fuses together and, when subsequently cooled, bonds the adjacent turns together. This invention is primarily directed to the bonding of motor armature coils using bondable wire but aspects of this invention are applicable also to the bonding of other types of coils such as stator coils, generator coils, bobbins or essentially any other type of electric coil.

BACKGROUND OF THE INVENTION

The vibration of wire segments resulting from the passage of electrical current through the wire in an electrical coil can damage the wire, such as by causing abrasion between adjacent turns of the wire. The use of bondable wire for bonding the coils of stators for electric motors or other electrical machines, such as generators and alternators, is a common practice. However, the use of bondable wires for armature coils is not entirely satisfactory because the bond strength is typically insufficient to withstand the centrifugal forces exerted on the coil turns created by the high rotary speeds of such armatures. Accordingly, other bonding processes, particularly impregnation processes, are usually used for bonding armature coils made either with or without the use of bondable wire.

Bondable wires have recently become available which are satisfactory for use in winding armatures without the need for other bonding processes. An example of an acceptable wire is available commercially under the trade designation "Alcotel Durobond 200 HR" bondable wire from Alcotel Magnet Wire division of Alcotel Canada, Inc., 140 Allstate Highway, Markham, Ontario, L3R0Z7.

The Alcotel Durobond 200 HR bondable wire employs a bondable compound which bonds at a higher temperature applied over a longer period of time than typical bondable wire. In order to meet the high production demands of modern manufacturing plants, there is a need for a manufacturing method and apparatus which enables the high speed bonding of armature coils yet enables the use of higher electrical currents to produce higher coil wire temperatures applied over relatively long periods of time. This invention is directed to such high speed bonding of coils made from the new bondable wires.

The invention is disclosed with reference to a specific embodiment shown in the accompanying drawings and described below. Those familiar with the art will recognize that many other embodiments are possible.

OBJECTS AND SUMMARY OF THE INVENTION

An object of the present invention is to provide a method and an apparatus which enable the high speed bonding of armature coils made from bondable wire.

Another object of this invention is to provide a method and an apparatus for bonding coils of electrical components whereby high electrical currents can be applied to coils to be bonded over relatively long periods of time.

Yet another object of this invention is to provide a method and an apparatus for bonding several armatures at the same time.

In accordance with this invention, high speed bonding of wound electric components having coils wound from bondable wire is obtained by providing a component support assembly having equally-spaced component-receiving stations and repeatedly indexing the stations in a predetermined direction through predetermined increments. Plural wound and unbonded electric components are loaded in plural, mutually-adjacent stations. After loading a first predetermined number of wound electric components, and while continuing to index the stations, an electric current is applied to the coils thereof to cause them to be heated and bonded.

Wound and unbonded components are continuously loaded into other stations while the electric current is being applied to the coils of the first predetermined number of wound components. After the supply of electric current to the coils is discontinued, an electric current is continuously applied to the coils of a second predetermined number of wound electric components, at least some of which have been loaded into stations while the coils of the first predetermined number of components are being bonded by the application of electric current thereto.

In the preferred embodiment of this invention, the component-receiving stations are formed on a rotatable support table and the electric current is supplied to the coils of components being bonded by rotatably mounting a bonding head plate about the axis of rotation of the support table, the bonding head plate having plural bonding heads for supplying electric current to the coils to be bonded. The bonding head plate is movable toward the support table to become engaged with the unbonded components to be bonded and to rotate with the support table while supplying electric current thereto. The bonding head plate is also movable away from the support table and rotatable relative to the support table so that it can be retracted away from the support table and repositioned to engage a different set of unbonded components.

In accordance with a preferred practice of this invention, the freshly bonded components remain on the support table until after several indexes to enable the components to cool down.

The method and apparatus of this invention are advantageously used for the bonding of armature coils. In such event, the apparatus may include plural armature shaft-gripping collets equally spaced around the axis of rotation of the support table, and a collet release mechanism to release the grip of the collets to permit removal, insertion, or indexing of an armature. An armature orienting mechanism may optionally be provided if needed to ensure proper electrical connection of the bonding heads to the armature's commutator bars.

Other objects and advantages will become apparent from the following description and the drawings.

BRIEF DESCRIPTION OF THE DRAWINGS

FIG. 4 is a simplified diagram of an armature orienting or indexing apparatus forming part of the machine shown in FIGS. 1 and 2.

FIG. 5 is a simplified cross-sectional view of a portion of the apparatus illustrated in FIG. 4.

FIG. 6 is a simplified diagrammatic view of a collet release mechanism forming part of the machine shown in FIGS. 1 and 2.

FIG. 7 is a simplified plan view of a portion of the mechanism illustrated in FIG. 6.

DETAILED DESCRIPTION

Figure 1:
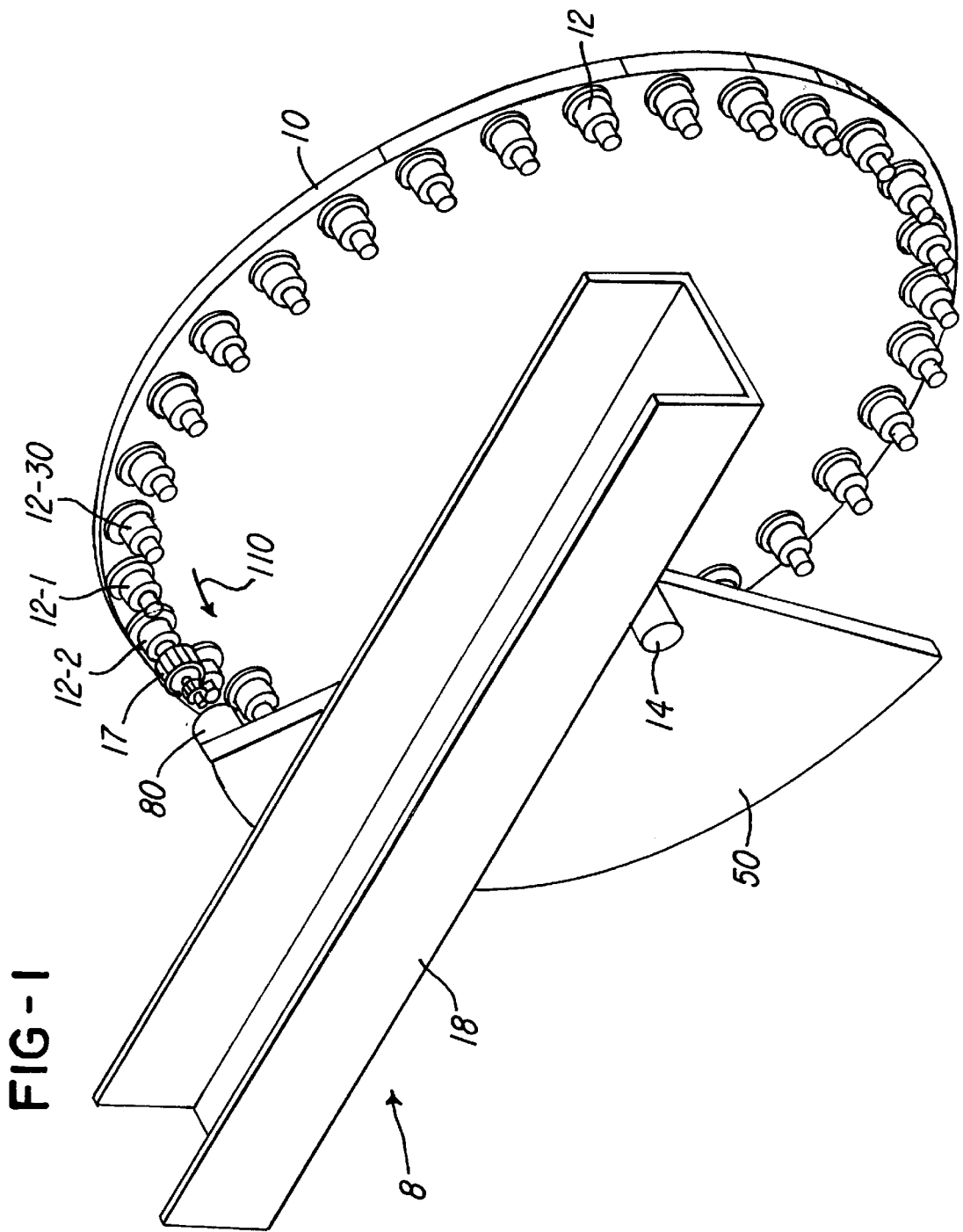
FIG. 1 is a highly simplified, fragmentary, diagrammatic perspective view of parts of a bonding machine in accordance with this invention.
Figure 2:
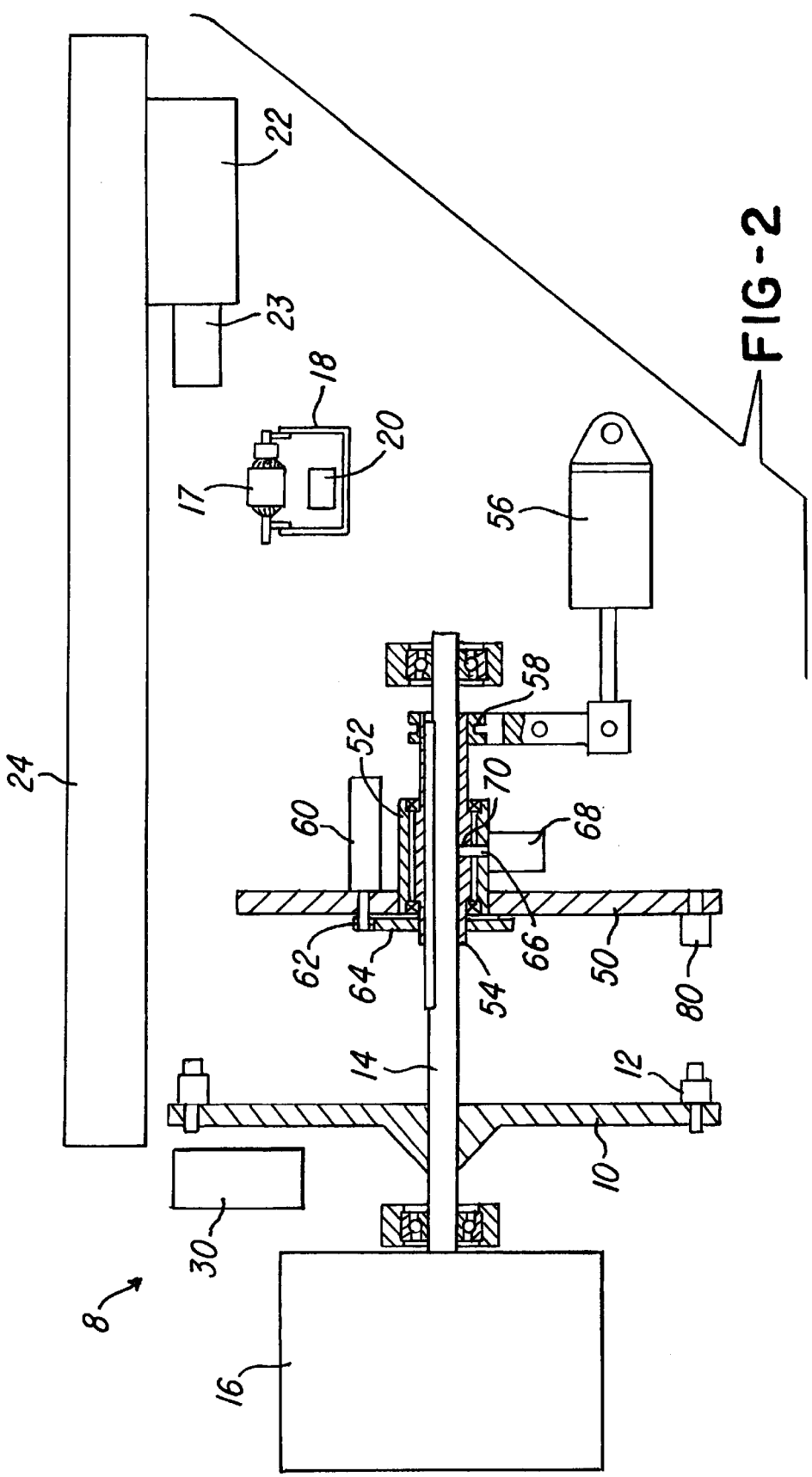
FIG. 2 is a highly simplified diagrammatic and schematic representation, with parts shown in cross section, of the bonding machine of this invention and including parts not illustrated in FIG. 1.
Figure 3:
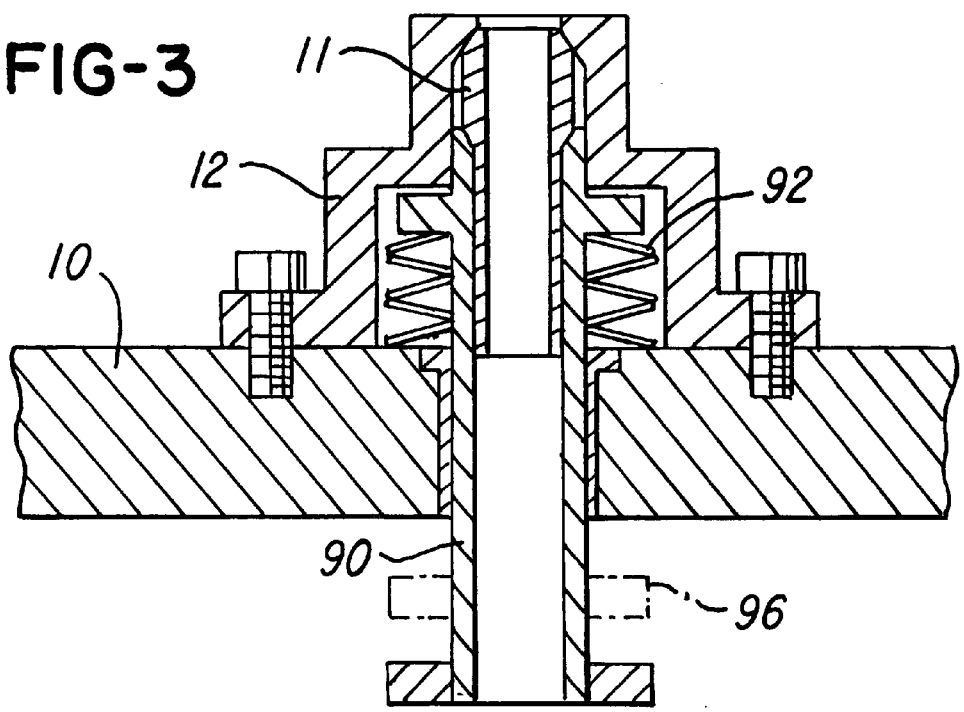
FIG. 3 is a fragmentary cross-sectional view of an armature support or supporting nest forming part of the machine shown in FIGS. 1 and 2.

With reference to FIGS. 1, 2, and 3, a bonding machine 8 in accordance with this invention includes an armature-support table 10 having thirty armature shaft-gripping collets 11 mounted in collet holders 12 equally spaced around the circumference of the table 10. The armature support table 10 is mounted for rotation about the horizontal axis of an index shaft 14 to which the table 10 is keyed. Index shaft 14 is repeatedly indexed by operation of an electric motor-driven indexing head or box 16 that is supported in any suitable fashion to the bed (not shown) of the machine 8.

Wound armatures 17 are delivered to and from the armature support table 10 by means of a chain conveyor 18 which has a dual lift chuck 20, and a transfer assembly including a dual parallel gripper assembly 22 and a non-rotating dual parallel rodless cylinder 24 which reciprocates the dual parallel gripper assembly 22 from a first position shown in FIG. 2 remote from the armature-support table 10 to a second position (not shown) at which it can insert a wound armature to be bonded into one collet holder 12 (designated 12-1 in FIG. 1) and remove a bonded armature from the adjacent collet holder 12 (designated 12-30 in FIG. 1). The gripper assembly 22 has two armature-shaft grippers 23 (only one of which, shown in FIG. 2, can be seen in the drawings). Grippers 23 could be similar to the gripper assemblies 150 and 152 shown in Dolgas, U.S. Pat. No. 5,372,319, a copy of which is attached hereto.

A collet release mechanism, generally designated 30, is operated to release or open the collets 11 in the collet holders 12 in the positions indicated as 12-1 and 12-30 in FIG. 1, and perhaps also in the position indicated as 12-2 in FIG. 1.

If needed, an armature indexing or orienting assembly, generally designated 40, shown in FIGS. 4 and 5, is used to orient each armature when it reaches the position occupied by collet holder 12-2 in FIG. 1. As an alternative, the armatures could already be oriented as needed when they are inserted into the collet holders. With reference to FIGS. 5 and 6, the indexing assembly 40 comprises an indexing head 41 having a through bore 42 which can be moved along a linear bearing THK by an air actuator 43 into surrounding relation to an armature about to be bonded. A first, indexing pawl or dog 44, when driven upwardly by an air actuator 45, enters an armature core slot and rotates the armature until an edge of an armature core slot stops against a second, stop dog or pawl 46. The position of the stop dog or pawl 46 can be accurately adjusted and maintained by upper and lower adjustment screws 47. Provided that the armature has commutator bars accurately circumferentially located with respect to the armature core slots, the positions of the commutator bars can be accurately circumferentially positioned by the indexing assembly 40 to ensure proper engagement of a pair of commutator bars by electrical contacts (described below) during the bonding process.

With reference to FIGS. 1 and 2, a bonding head plate 50 is mounted on an outer bonding head-supporting sleeve 52 supported for rotation by bearings on an inner bonding head support sleeve 54 that is splined to the index shaft 14. As is apparent, the inner sleeve 54 rotates with the index shaft 14 and can be linearly moved along the index shaft 14 by operation of an air cylinder 56 operatively associated with a grooved pulley 58 keyed to the inner sleeve 54. An air motor with gearhead 60 is mounted on the bonding head plate 50 and has a pinion 62 engaged with gear teeth on the outer margin of gear plate 64 affixed to the inner sleeve 54. As is apparent, rotation of the pinion 62 powered by the gearhead air motor 60 can be used to cause rotation of the bonding head plate 50. The bonding head plate 50 can be locked relative to the inner sleeve 54 and, accordingly, the index shaft 14 and the armature support plate 10 by means of a lock pin 66 driven by a lock-pin actuator 68 shown in FIG. 1. The lock pin 66 is adapted to enter into any one of three equally circumferentially-spaced lock pin-receiving bores 70 in the inner sleeve 54 for maintaining bonding heads 80 on the bonding head plate 50 accurately aligned with each of three different sets of collet holders 12 to ensure that the individual bonding heads 80 are accurately aligned with individual ones of the collet holders 12 for reasons which will become apparent. Only one of the lock pin-receiving bores 70 is illustrated in FIG. 2. Also, not all of the collet holders 12 and bonding heads 80 are shown in FIG. 2. In the illustrated embodiment there are ten bonding heads 80 aligned with respective locations of ten of the collet holders 12.

Figure 8:
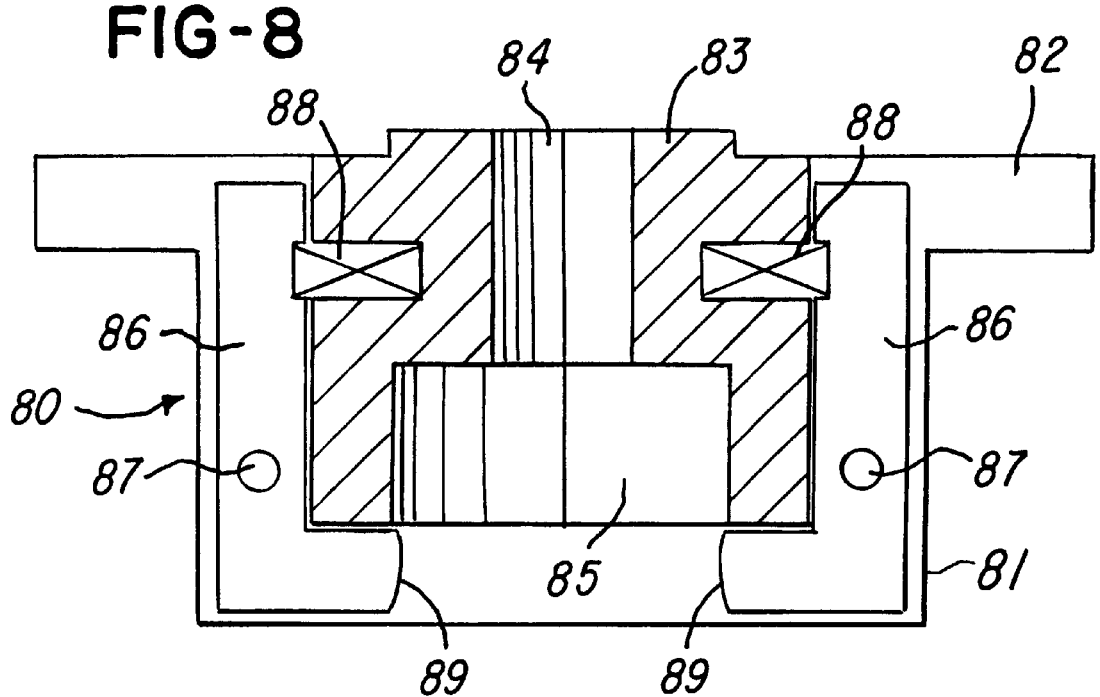
FIG. 8 is a simplified diagram of a bonding head forming part of the machine shown in FIGS. 1 and 2.

Referring to FIG. 8, each bonding head 80 comprises a cylindrical housing 81 having a surrounding flange 82 with through bores (not shown) through which mounting screws or bolts (not shown) extend for fastening the housing 81 onto the bonding head plate 50. An insulating block 83 having bores 84 and 85 for receiving, respectively, the shaft and the commutator of an armature to be bonded, is centrally located within the housing 81. A pair of diametrically opposed, L-shaped, electrical, bonding contacts 86 are pivotally mounted by pivot pins 87 in the housing 81 and biased by springs 88 into positions in which they engage diametrically opposed commutator bars of an armature to be bonded. The commutator-engaging surfaces 89 of the electrical contacts 86 are curved so that the bonding head 80 can readily be engaged to an armature held by a collet 11 before bonding and retracted from the collet 11 after bonding.

With reference to FIG. 3, each collet holder 12 retains a collet 11 and has a hollow cylindrical collet actuator 90 biased by a spring formed by Belleville washers 92 to cause the collet 11 to grip an armature shaft. With reference also to FIGS. 6 and 7, a collet release lever 94 has a forked end 96 which can be extended by operation of a first collet release air cylinder 98 into straddling relationship with respect to the collet actuator 90 as indicated by phantom lines 96 in FIG. 3. Thereafter, by operation of a second collet release air cylinder 100, the collet actuator 90 can be pulled against the bias of the Belleville washers 92 to release the grip of the collet 11 on an armature shaft.

In order to obtain high speed production using a bondable wire which requires application of electricity to the commutators over long periods of time, one of the objects of this invention is to bond several armatures at the same time. Another object of this invention is to provide time for the armatures to cool down after the bonding process is completed before they are removed from the bonding machine 8.

Following is a description of a method of operating the bonding machine 8, under the control of conventional machine control circuitry (not shown), to produce a bonded armature every six seconds in cases in which the electrical energy must be supplied to the commutator for thirty seconds. Other bonding times and complete cycle times will vary in accordance with the requirements of the bondable wire. To enable removal of a bonded armature every six seconds from the machine 8, the armature support table 10 is indexed through 12 degrees every six seconds. After each index, an armature is removed from the collet holder at position 12-30 by one of the grippers (not shown) of the dual head parallel gripper 22. At the same time, the other gripper inserts an armature into the collet holder at position 12-1. If an armature indexing or orienting step is required, the orienting assembly 40 shown in FIGS. 4 and 5 can be used to orient the armature at locations 12-2. At each of stations 12-30, 12-1 and 12-2, the collet release mechanism 30 shown in FIGS. 6 and 7 can be used to release the grip of the collets 11 on the armature shafts to permit removal, insertion, or indexing of an armature. Accordingly, there could be three release mechanisms 30 or, optionally, a single mechanism 30 could have three forks 96, one for each of the stations 12-30, 12-1, and 12-2.

After there are ten collet holders 12 loaded with armatures past station 12-1 or 12-2 (if station 12-2 is required to be used for indexing the armature), the bonding head plate 50 is driven by the air cylinder 56 into a position in which the armatures in the ten collet holders 12 are engaged by respective ones of the bonding heads 80. Electrical current is then supplied to both bonding head contacts 86 of each of the bonding heads 80 in order to cause the armature coils to become hot. A substantial current may be required at the outset of the bonding process so, in order to limit the size of the electrical transformer (not shown) used to supply the electrical current to the contacts 86, the contacts are preferably initially supplied with current in seriatim, beginning with the bonding head 80 most counterclockwise from station 12-1. The bonding head plate 50 follows along with the indexing of the support table 10. During the next five indexes of the support table 10, current is supplied to the first of the armatures to receive current. Other armatures being bonded will continue to receive current for longer periods of time, so that each receives current for thirty seconds. After a total of 10 indexing steps, the bonding head plate 50 is retracted by the air cylinder 56 and rapidly returned to its starting position by operation of the gearhead motor 60. At this time, the next ten collet holders have been loaded with armatures and the foregoing process is repeated to bond such armatures. As the bonding of the second set of ten armatures is taking place, the bonded armatures are indexed in seriatim to station 12-30 for removal. Each bonded armature has substantial time to cool down before it is removed from the support table 50. If needed, refrigeration equipment could be used to accelerate the cooling down of the armatures.

Although the presently preferred embodiments of this invention have been described, it will be understood that within the purview of the invention various changes may be made within the scope of the following claims.

Having thus described my invention, I claim:

1. A method for high speed bonding of electric coils of a wound electric component, said coils being wound from bondable wire, said method comprising:

providing a component support assembly having equally-spaced component-receiving stations;

continuously indexing said stations in a predetermined direction through predetermined increments;

loading plural wound electric components in plural, mutually-adjacent ones of said stations;

after loading a first predetermined number of said wound electric components in mutually-adjacent ones of said stations, and while continuing to index said stations, applying an electric current continuously to the coils of the first predetermined number of loaded components to cause said coils to be heated to bond said coils;

continuing to load wound components into said stations while continuing to apply an electric current to the coils of said first predetermined number of wound components;

after completing the bonding of the coils of the first predetermined number of components, discontinuing the application of electric current to said coils;

thereafter, and while continuing to index said stations, applying an electric current continuously to the coils of a second predetermined number of wound electric components, at least some of which have been loaded into stations while the coils of said first predetermined number of components are being bonded by the application of electric current thereto.

2. The method of claim 1 wherein said stations are located in a rotatably-mounted support table and equally spaced about the axis of rotation of said support table.

3. The method of claim 2 further comprising retaining said first predetermined number of components on said support table after discontinuing the application of electric current to the coils thereof to provide a cool down period during which their bonded coils can cool down before removing the bonded components from said support table; and removing the first predetermined number of components in seriatim from said support table to provide open stations to receive unbonded components.

4. The method of claim 2 wherein electric current is supplied to the coils of components being bonded by steps including:

rotatably mounting a bonding head plate about the axis of rotation of said support table, said bonding head plate having plural bonding heads for supplying electric current to the coils of said components;

moving said bonding head plate toward said support table so that said bonding heads engage terminals of said wound components to be bonded;

maintaining said bonding heads engaged with said terminals while said first predetermined number of components are being bonded by indexing said bonding head plate with said support table; and moving said bonding head plate away from said support table when the application of electric current to the coils of said first predetermined number of components is completed.

5. An apparatus for the high speed bonding of coils on wound electric components, said apparatus comprising:

an index shaft;

means for rotating said index shaft;

a bonding head plate mounted on said index shaft for axial movement therealong;

means for rotating said bonding head plate relative to said index shaft;

a plurality of bonding heads mounted to said bonding head plate to supply electrical current for bonding coils;

a support table mounted on said index shaft for rotation therewith;

a plurality of support members for supporting wound electric components on said support table in position to be engaged by said bonding heads;

means for moving said bonding head plate along said index shaft toward and away from said support table; and means for axially and rotatably locking said bonding head plate on said index shaft.

6. The apparatus of claim 5 wherein said wound electric component comprises an armature, and wherein said support members comprise plural armature shaft-gripping collets equally spaced around the axis of rotation of said index shaft;

at least one collet release mechanism adapted to release an armature gripped by a collet to permit removal, insertion, or indexing of an armature;

means for delivering wound armatures to and from said support table;

means for inserting an unbonded wound armature into one collet; and means for removing a bonded armature from another collet.

7. The apparatus of claim 6 further comprising an armature indexing or orienting assembly to orient each armature during insertion into one of said collets comprising an indexing head movable along a linear bearing, a pair of adjustable indexing pawls located within said indexing head, and means for moving one of said pawls into engagement with an armature core slot to rotate the armature until rotation of the armature is stopped by engagement with the other of said pawls.

* * * * *